(12) United States Patent
Stewart et al.

(10) Patent No.: US 8,217,104 B2
(45) Date of Patent: Jul. 10, 2012

(54) HIGHLY TRANSPARENT AND TOUGH-STIFF STYRENE-BUTADIENE BLOCK COPOLYMER MIXTURES

(75) Inventors: Jennifer Stewart, Dearborn, MI (US); Peter Merkel, Zellertal (DE); Daniel Wagner, Bad Dürkheim (DE); Konrad Knoll, Mannheim (DE); Jürgen Koch, Neuhofen (DE)

(73) Assignee: Styrolution GmbH (DE)

( * ) Notice: Subject to any disclaimer, the term of this patent is extended or adjusted under 35 U.S.C. 154(b) by 375 days.

(21) Appl. No.: 12/306,258

(22) PCT Filed: Jun. 13, 2007

(86) PCT No.: PCT/EP2007/055799
§ 371 (c)(1),
(2), (4) Date: Dec. 23, 2008

(87) PCT Pub. No.: WO2008/000623
PCT Pub. Date: Jan. 3, 2008

(65) Prior Publication Data
US 2009/0286918 A1   Nov. 19, 2009

Related U.S. Application Data

(60) Provisional application No. 60/816,727, filed on Jun. 27, 2006.

(51) Int. Cl.
*C08F 293/00* (2006.01)
*C08F 295/00* (2006.01)
*C08F 297/04* (2006.01)
*C08L 53/00* (2006.01)
*C08L 53/02* (2006.01)

(52) U.S. Cl. ............ 524/314; 525/99; 525/95; 525/314; 524/505

(58) Field of Classification Search ............... 524/505; 525/99, 95, 314, 89
See application file for complete search history.

(56) References Cited

U.S. PATENT DOCUMENTS

| 3,639,517 | A | 2/1972 | Kitchen et al. |
| 5,284,915 | A | 2/1994 | Custro et al. |
| 6,011,117 | A * | 1/2000 | Perkins et al. ............... 525/99 |
| 6,369,160 | B1 | 4/2002 | Knoll et al. |
| 2005/0215723 | A1 | 9/2005 | Knoll et al. |

FOREIGN PATENT DOCUMENTS

| DE | 19810141 | 9/1999 |
| EP | 1580234 | 9/2005 |
| WO | WO-00-58380 | 10/2000 |
| WO | WO-2006-036301 | 4/2006 |

OTHER PUBLICATIONS

International Preliminary Report on Patentability of International Application No. PCT/EP2007/055799 issued on Aug. 28, 2008.

* cited by examiner

*Primary Examiner* — James J Seidleck
*Assistant Examiner* — Deve E Valdez
(74) *Attorney, Agent, or Firm* — Connolly Bove Lodge & Hutz LLP

(57) ABSTRACT

A mixture which comprises
  a) from 25 to 75% by weight of a block copolymer A which comprises at least one hard block S composed of vinylaromatic monomers and comprises one or more soft blocks $B_A$ in each case composed of from 0 to 5% by weight of vinylaromatic monomers and from 95 to 100% by weight of dienes, where the proportion by weight of the hard blocks S in the block copolymer A is from 65 to 90% by weight;
  b) from 5 to 25% by weight of a block copolymer B which comprises at least one hard block S composed of vinylaromatic monomers and comprises one or more copolymer blocks $(B/S)_B$ in each case composed of from 20 to 60% by weight of vinylaromatic monomers and from 80 to 40% by weight of dienes, where the proportion by weight of the hard blocks S in the block copolymer B is from 25 to 70% by weight;
  c) from 0 to 70% by weight of polystyrene or of a block copolymer C other than A and B, and
  d) from 0 to 6% by weight of a plasticizer D,
where the entirety of components A) to D) gives 100% by weight, and use for transparent thermoforming foils or transparent injection-molded items.

22 Claims, No Drawings

HIGHLY TRANSPARENT AND TOUGH-STIFF STYRENE-BUTADIENE BLOCK COPOLYMER MIXTURES

CROSS REFERENCE TO RELATED APPLICATIONS

This application is a national phase of PCT/EP2007/055799, filed on Jun. 13, 2007, which claims priority to U.S. Provisional Patent Application No. 60/816,727, filed on Jun. 27, 2006, the entire contents of which are incorporated herein by reference in their entireties.

The invention relates to a mixture which comprises
a) from 25 to 75% by weight of a block copolymer A which comprises at least one hard block S composed of vinylaromatic monomers and comprises one or more soft blocks $B_A$ in each case composed of from 0 to 5% by weight of vinylaromatic monomers and from 95 to 100% by weight of dienes, where the proportion by weight of the hard blocks S in the block copolymer A is from 65 to 90% by weight;
b) from 5 to 25% by weight of a block copolymer B which comprises at least one hard block S composed of vinylaromatic monomers and comprises one or more copolymer blocks $(B/S)_B$ in each case composed of from 20 to 60% by weight of vinylaromatic monomers and from 80 to 40% by weight of dienes, where the proportion by weight of the hard blocks S in the block copolymer B is from 25 to 70% by weight;
c) from 0 to 70% by weight of polystyrene or of a block copolymer C other than A and B, and
d) from 0 to 6% by weight of a plasticizer D,
where the entirety of components A) to D) gives 100% by weight.

U.S. Pat. No. 3,639,517 describes styrene-butadiene block copolymers branched in the shape of a star and having from 75 to 95 percent by weight of terminal blocks composed of vinylaromatic monomers and from 5 to 30 percent by weight of elastomeric blocks composed mainly of conjugated diene units. They can be blended with standard polystyrene to give highly transparent mixtures. As the proportion of polystyrene increases, the modulus of elasticity increases at the cost of toughness. Mixtures with as little as about 40 percent by weight of polystyrene are too brittle for most applications. The amount of polystyrene that can be admixed while retaining acceptable ductility is mostly from only 20 percent by weight to a maximum of 30 percent by weight.

Star-shaped block copolymers having 40% by weight of hard blocks composed of vinylaromatic monomers and having soft blocks having a random structure composed of vinylaromatic monomers and dienes are described in WO 00/58380. Even with 60 percent by weight of polystyrene they continue to give ductile mixtures. The disadvantage of said blends is marked visible haze which is unacceptable for relatively demanding applications and for relatively thick components.

It is an object of the present invention to find mixtures of styrene-butadiene block copolymers which are tough and stiff and simultaneously have high transparency.

The abovementioned mixture has accordingly been found.

Even very small proportions of the block copolymer B raise the ductility of mixtures composed of block copolymer A and polystyrene markedly, without any significant fall-off in transparency. The polystyrene content that can be used in the mixture while still achieving a certain observed ductility depends on the block copolymer A/block copolymer B ratio. The smaller this ratio, the greater the possible amount of polystyrene admixture. Block copolymer A/block copolymer B mixing ratios are preferably in the range from 90/10 to 70/30, particularly preferably around 80/20. If the block copolymer A/block copolymer B ratio is 80/20, the mixture preferably comprises from 35 to 40 percent by weight of polystyrene.

The mixture preferably comprises from 35 to 55% by weight of the block copolymer A, from 10 to 20% by weight of the block copolymer B, and from 25 to 55% by weight of a polystyrene or of a block copolymer C other than A and B. The mixture can also comprise relatively small amounts of further thermoplastic polymers alongside the block copolymers A, B, and, if appropriate, C, and can also comprise from 1 to 6% by weight of conventional, auxiliaries, such as plasticizers. Plasticizers which can be used are from 0 to 6% by weight, preferably from 2 to 4% by weight, of a homogeneously miscible oil or oil mixture, in particular white oil or dioctyl adipate, or a mixture of these.

Block Copolymer A:

The mixture comprises from 25 to 75% by weight of a block copolymer A which comprises at least one hard block S composed of vinylaromatic monomers and comprises one or more soft blocks $B_A$ in each case composed of from 0 to 5% by weight of vinylaromatic monomers and from 95 to 100% by weight of dienes, where the proportion by weight of the hard blocks S in the block copolymer A is from 65 to 90% by weight, preferably from 70 to 80% by weight.

The glass transition temperature of the block $B_A$ is preferably in the range from −70 to −100° C. The glass transition temperature is affected by the monomer constitution and the 1,2-vinyl content of the diene units and can be determined via Differential Scanning Calorimetry (DSC) or Differential Thermal Analysis (DTA), or calculated from the Fox equation. The block $B_A$ is preferably composed of 100% by weight of butadiene.

The block copolymer A can, by way of example, be prepared via sequential anionic polymerization using alkyllithium compounds, if appropriate in the presence of randomizers, such as tetrahydrofuran or potassium salts. Preference is given to the use of potassium salts with a ratio of anionic initiator to potassium salt in the range from 25:1 to 60:1. This can simultaneously achieve low content of 1,2-linkages of the butadiene units.

The content of 1,2-linkages of the butadiene units is preferably in the range from 8 to 15%, based on the entirety of the 1,2-, 1,4-cis-, and 1,4-trans-linkages.

The block copolymer A is particularly preferably composed of star polymers $[S-B_A]_nX$, having n arms of the star, these being obtainable via coupling, using an n-functional coupling agent X, or via initiation using an n-functional initiator. An example of a suitable coupling agent is epoxidized vegetable oil, such as epoxidized linseed oil or epoxidized soybean oil. In this instance, stars having from 3 to 5 arms are obtained.

The weight-average molar mass $M_w$ of the copolymer block $B_A$ is generally in the range from 20 000 to 80 000 g/mol. The blocks S are preferably composed of styrene units. In the case of the anionically prepared polymers, the molar mass is controlled by way of the ratio of amount of monomer to amount of initiator. However, it is also possible to add initiator more than once after monomer feed has taken place, the result then being a bi- or multimodal distribution.

The block copolymer A preferably has a star-shaped structure having terminal blocks $S_1$ whose number-average molar mass $M_n$ is in the range from 5000 to 30 000 g/mol and has terminal blocks $S_2$ whose number-average molar mass $M_n$ is in the range from 35 000 to 150 000 g/mol. The molar $S_1/S_2$ ratio for the block copolymer A is generally in the range from 0.5:1 to 10:1, preferably in the range from 1:1 to 5:1. By way of example, it can be achieved via sequential anionic polymerization of the arms of the star, using double initiator feed in an appropriate molar ratio. The vinylaromatic monomer preferably used in the structure of the blocks S is styrene.

Suitable block copolymers A are commercially available as Styrolux® 3G 33, Styroclear GH 62, K-Resin 03, K-Resin 01, or Kraton D 1401P.

Block Copolymer B

The inventive mixture comprises, as block copolymer B, from 5 to 25% by weight of a block copolymer B which comprises at least one hard block S composed of vinylaromatic monomers and comprises one or more copolymer blocks $(B/S)_B$ in each case composed of from 20 to 60% by weight of vinylaromatic monomers and from 80 to 40% by weight of dienes, where the proportion by weight of the hard blocks S in the block copolymer B is from 25 to 70% by weight.

Particularly suitable block copolymers B are stiff block copolymers composed of from 60 to 90% by weight of vinylaromatic monomers and from 10 to 40% by weight of diene, based on the entire block copolymer, and composed of hard blocks S mainly comprising vinylaromatic monomers, in particular styrene, and of soft blocks B or B/S comprising dienes, such as butadiene and isoprene. Block copolymers having from 70 to 80% by weight of styrene and from 20 to 30% by weight of diene are particularly preferred.

The number-average molar mass $M_n$ of the soft blocks $(B/S)_B$ of the block copolymer B is preferably from 50 000 to 150 000 g/mol, and its glass transition temperature $Tg_B$ is preferably in the range from −650 to 0° C.

The copolymer blocks $(B/S)_B$ of the block copolymer B preferably have random distribution of the vinylaromatic monomers and dienes. Preference is likewise given to block copolymers B which have at least two successive copolymer blocks $(B/S)_B$ having in each case a monomer gradient from vinylaromatic monomers to dienes.

Preferred block copolymers B have a star-shaped structure having at least two terminal hard blocks $S_1$ and $S_2$ with different molecular weight composed of vinylaromatic monomers, and the proportion of the entirety of the hard blocks S is at least 40% by weight, based on the entire block copolymer B. Linear structures are also possible, for example $(B/S)_B$-$S_2$ or $S_1$-$(B/S)_B$-$S_2$. The number-average molar mass $M_n$ is preferably in the range from 5000 to 30 000 g/mol for the terminal blocks $S_1$ and preferably in the range from 35 000 to f 50 000 g/mol for $S_2$.

Preference is given to polymodal styrene-butadiene block copolymers having terminal styrene blocks, for example those described in DE-A 25 50 227, EP-A 0 654 488, or EP-A 0 761 704.

Particular preference is given to the block copolymers B described in WO 00/58380, having at least two terminal hard blocks $S_1$ and $S_2$ composed of vinylaromatic monomers and, between these, at least one random soft block $(B/S)_B$ composed of vinylaromatic monomers and dienes, where the proportion of the hard blocks is from 40 to 60% by weight, based on the entire block copolymer, and the 1,2-vinyl content in the soft block $(B/S)_B$ is below 20%.

Suitable block copolymers B are commercially available as Styrolux® 3G 55, Finaclear® 520, or K-Resin® XK40.

The inventive mixtures are highly transparent and are suitable for production of foils, in particular thermoforming foils, which demand a combination of high transparency and luster with high stiffness and adequate toughness, or blister-pack foils. They are also suitable for injection-molding applications, for example transparent clothes hangers or transparent toys, or for medical-technology items.

EXAMPLES

Block Copolymer A

To prepare the star-shaped styrene-butadiene block copolymer A, 643 l of cyclohexane were used as initial charge, titrated to the end point at 60° C. with 1.6 ml of sec-butyllithium (BuLi), and then mixed with 821 ml of a 1.35 molar sec-butyllithium solution for initiation, and cooled to 40° C. The polymerization reaction was carried out in two portions, and the maximum temperature was restricted to 75° C. by counter-cooling. First, 96.6 kg of styrene were metered in and a styrene block $S_1$ was polymerized. A further 3.612 l of the 1.35 molar sec-butyllithium solution were then added, and a further 53.5 kg of styrene were metered in. Once conversion was complete, 49.9 kg of butadiene were added; and polymerized. The living polymer chains were then coupled via addition of Edenol B 82, the mixture was acidified with $CO_2$/water, and a stabilizer solution was added. The cyclohexane was evaporated in a vacuum drying cabinet.

Block Copolymer B:

A star-shaped block copolymer B (26% by weight of butadiene, 74% by weight of styrene) having random copolymer blocks B/S was prepared via sequential anionic polymerization of styrene and butadiene and subsequent coupling using epoxidized linseed oil, as in example 17 of WO 00/58380.

Component C

The component C used comprised standard polystyrene PS158 K whose $M_w$ was 270 000 and whose $M_n$ was 103 000, from BASF Aktiengesellschaft.

Mixing Examples 1 to 15

Each of the block copolymer mixtures was prepared via melting of the parts by weight stated in table 1 of the block copolymers A and B, and also of component C (polystyrene PS158 K) in an extruder and then pressed to give plaques of thickness 2 mm or disks of thickness 4 mm.

1c, 6c, and 11c are comparative examples

TABLE 1

Proportions by weight of the block copolymers A, B, and polystyrene PS 158 K in mixing examples 1 to 15:

| Example | Block copolymer A | Block copolymer B | Polystyrene PS 158 K |
|---|---|---|---|
| 1c | 40 | 0 | 60 |
| 2 | 36 | 4 | 60 |
| 3 | 32 | 8 | 60 |
| 4 | 28 | 12 | 60 |
| 5 | 24 | 16 | 60 |
| 6c | 50 | 0 | 50 |
| 7 | 45 | 5 | 50 |
| 8 | 40 | 10 | 50 |
| 9 | 35 | 15 | 50 |
| 10 | 30 | 20 | 50 |
| 11c | 60 | 0 | 40 |
| 12 | 54 | 6 | 40 |
| 13 | 48 | 12 | 40 |
| 14 | 42 | 18 | 40 |
| 15 | 36 | 24 | 40 |

Mechanical properties, such as modulus of elasticity, stress, and strain were determined on plaques pressed at 200° C. of thickness 2 mm, to ISO 527. Optical properties, such as yellowness index (YI), haze and transparency, were determined on disks pressed at 200° C. of thickness 4 mm to ASTM D1925-70. The values measured for mixtures 1 to 15 have been collated in table 2.

TABLE 2

Mechanical and optical properties of mixtures 1 to 15

|    | Modulus of elasticity [N/mm$^2$] | Yield stress [N/mm$^2$] | Tensile strain at break [%] | Transparency [%] | Haze [%] | YI [%] |
|----|---|---|---|---|---|---|
| 1c | 1973 | 34.7 | 12.4 | 76.7 | 6.4 | 24.1 |
| 2  | 2179 | 37.6 | 16.4 | 76.9 | 6.2 | 24.5 |
| 3  | 1719 | 33   | 42   | 73.6 | 7.8 | 28.5 |
| 4  | 1950 | 35.3 | 20.6 | 71.2 | 8.8 | 32.8 |
| 5  | 1569 | 31.2 | 18.8 | 72.2 | 8.5 | 31.6 |
| 6c | 1879 | 30.7 | 19   | 80.8 | 4.9 | 16.6 |
| 7  | 1766 | 27.6 | 42.7 | 80.4 | 5.5 | 17.4 |
| 8  | 1656 | 29   | 67.1 | 78.3 | 5.4 | 20.7 |
| 9  | 1229 | 27.1 | 115  | 76.7 | 6.4 | 24.6 |
| 10 | 1119 | 25.4 | 135  | 73.6 | 8   | 29.8 |
| 11c| 1553 | 24.5 | 159  | 83.2 | 4.6 | 11.9 |
| 12 | 1601 | 24.6 | 170  | 82.6 | 4.7 | 13.5 |
| 13 | 1646 | 24.6 | 194  | 82.5 | 4.9 | 13.9 |
| 14 | 1454 | 25.8 | 210  | 81.3 | 5.6 | 16.3 |
| 15 | 1153 | 24.6 | 233  | 79.4 | 6.3 | 20   |

The invention claimed is:

1. A transparent mixture, comprising
 a) from 25 to 75% by weight of a block copolymer A which comprises at least one hard block S composed of vinylaromatic monomers and comprises one or more soft blocks $B_A$ in each case composed of from 0 to 5% by weight of vinylaromatic monomers and from 95 to 100% by weight of dienes, where the proportion by weight of the hard blocks S in the block copolymer A is from 65 to 90% by weight;
 b) from 5 to 25% by weight of a block copolymer B which comprises a star-shaped structure having at least two terminal hard blocks $S_1$ and $S_2$ with different molecular weight composed of vinylaromatic monomers and comprises one or more copolymer blocks $(B/S)_B$ in each case composed of from 20 to 60% by weight of vinylaromatic monomers and from 80 to 40% by weight of dienes, where the proportion by weight of the hard blocks S in the block copolymer B is from 40 to 70% by weight;
 c) from 0 to 70% by weight of polystyrene or of a block copolymer C other than A and B, and
 d) from 0 to 6% by weight of a plasticizer D,
where the entirety of components A) to D) gives 100% by weight.

2. The transparent mixture according to claim 1, which comprises
 a) from 35 to 55% by weight of the block copolymer A,
 b) from 10 to 20% by weight of the block copolymer B, and
 c) from 25 to 55% by weight of polystyrene or of a block copolymer C other than A and B.

3. The transparent mixture according to claim 1, wherein the glass transition temperature $Tg_A$ of the soft blocks $B_A$ of the block copolymer A is in the range from −70° to −100° C.

4. The transparent mixture according to any of claim 1, wherein the glass transition temperature $Tg_B$ of the soft blocks $(B/S)_B$ of the block copolymer B is in the range from −65° to 0° C.

5. The transparent mixture according to any of claim 1, wherein the number-average molar mass $M_n$ of the block $B_A$ of the block copolymer A is in the range from 20 000 to 80 000 g/mol.

6. The transparent mixture according to any of claim 1, wherein the number-average molar mass $M_n$ of the block $(B/S)_B$ of the block copolymer B is in the range from 50 000 to 150 000 g/mol.

7. The transparent mixture according to any of claim 1 wherein each of the block copolymers A and B has a star-shaped structure and the hard blocks S are terminal to the arms of the star.

8. The transparent mixture according to any of claim 1, wherein the copolymer blocks $(B/S)_B$ of the block copolymer B have random distribution of the vinylaromatic monomers and dienes.

9. The transparent mixture according to claim 1, wherein the block copolymer B comprises at least two successive copolymer blocks $(B/S)_B$ each having a monomer gradient from vinylaromatic monomers to dienes.

10. The transparent mixture according to claim 1, wherein the star-shaped block copolymer B has terminal blocks $S_1$ whose number-average molar mass $M_n$ is in the range from 5000 to 30 000 g/mol and has terminal blocks $S_2$ whose number-average molar mass $M_n$ is in the range from 35 000 to 150 000 g/mol.

11. The transparent mixture according to claim 10, wherein the block copolymer A has a star-shaped structure having terminal blocks $S_1$ whose number-average molar mass $M_n$ is in the range from 5000 to 30 000 g/mol and having terminal blocks $S_2$ whose number-average molar mass $M_n$ is in the range from 35 000 to 150 000 g/mol.

12. The transparent mixture according to claim 11, wherein a molar ratio $S_1/S_2$ for the block copolymer A is in the range from 0.5:1 to 10:1.

13. The transparent mixture according to claim 2, wherein a glass transition temperature $Tg_A$ of soft blocks $B_A$ of the block copolymer A is in the range from −70° to −100° C.

14. The transparent mixture according to claim 2, wherein a glass transition temperature $Tg_B$ of soft blocks $(B/S)_B$ of the block copolymer B is in the range from −65° to 0° C.

15. The transparent mixture according to claim 3, wherein a glass transition temperature $Tg_B$ of soft blocks $(B/S)_B$ of the block copolymer B is in the range from −65° to 0° C.

16. The transparent mixture according to claim 2, wherein a number-average molar mass $M_n$ of the block $B_A$ of the block copolymer A is in the range from 20 000 to 80 000 g/mol.

17. The transparent mixture according to claim 3, wherein a number-average molar mass $M_n$ of the block $B_A$ of the block copolymer A is in the range from 20 000 to 80 000 g/mol.

18. The transparent mixture according to claim 4, wherein a number-average molar mass $M_n$ of the block $B_A$ of the block copolymer A is in the range from 20 000 to 80 000 g/mol.

19. The transparent mixture according to claim 2, wherein a number-average molar mass $M_n$ of the block $(B/S)_B$ of the block copolymer B is in the range from 50 000 to 150 000 g/mol.

20. The transparent mixture according to claim 3, wherein a number-average molar mass $M_n$ of the block $(B/S)_B$ of the block copolymer B is in the range from 50 000 to 150 000 g/mol.

21. The transparent mixture according to claim 2, which comprises c) from 25 to 55% by weight of polystyrene.

22. The transparent mixture according to claim 2, which comprises at least 40% by weight of polystyrene.

* * * * *